United States Patent [19]
Caruso, Jr.

[11] 3,725,930
[45] Apr. 3, 1973

[54] MICROWAVE RADIOMETRIC AIRCRAFT LANDING ASSIST SYSTEM

[76] Inventor: Philip J. Caruso, Jr., 15611 Del Prado Drive, Hacienda Heights, Calif. 91745

[22] Filed: May 15, 1969

[21] Appl. No.: 824,860

[52] U.S. Cl. ........................343/100 ME, 343/108 R
[51] Int. Cl. ..............................................G01w 1/00
[58] Field of Search ...................343/100 ME, 108 R

[56] References Cited

UNITED STATES PATENTS

| | | | |
|---|---|---|---|
| 2,502,974 | 4/1950 | McElhannon | 343/112 R X |
| 2,458,654 | 1/1949 | Southworth | 343/100 ME UX |
| 2,944,151 | 7/1960 | Whitney et al. | 343/108 R X |
| 3,067,283 | 12/1962 | Petritz et al. | 250/83.3 HP X |

Primary Examiner—Samuel Feinberg
Assistant Examiner—Richard E. Berger
Attorney—Jessup & Beecher

[57] ABSTRACT

A microwave radiometric landing assist system is provided which serves as an aid for landing aircraft, for example, and which may complement the present practice of using visible light sources for runway guidance. The landing assist system of the present invention involves the use of passive metallic objects positioned on the ground in a predetermined pattern. These objects are detected by a microwave radiometric receiving system located in the aircraft, and which likewise may be considered passive in that it does not radiate energy from the aircraft. The microwave radiometric landing assist system of the invention provides a display for the pilot which is analogous to the display provided by visible light sources, for example, but which is available day and night and under all types of weather conditions. The information presented to the pilot is obtained at a rapid rate over an area which includes the metallic objects pattern. The area frame rate is fast enough to allow the pilot to react properly in flying the terminal approach.

5 Claims, 12 Drawing Figures

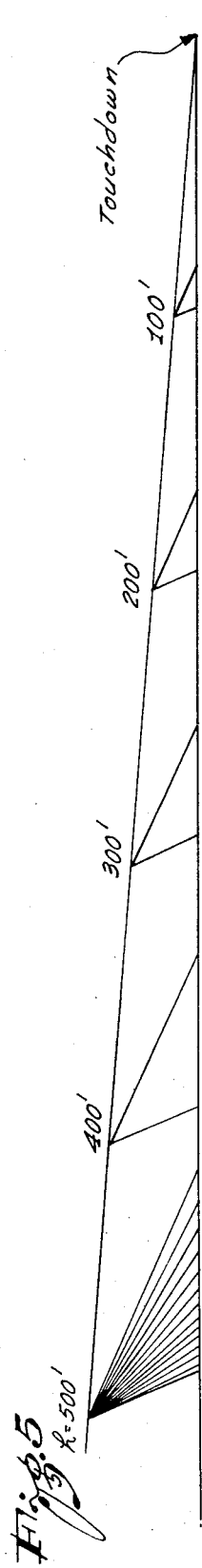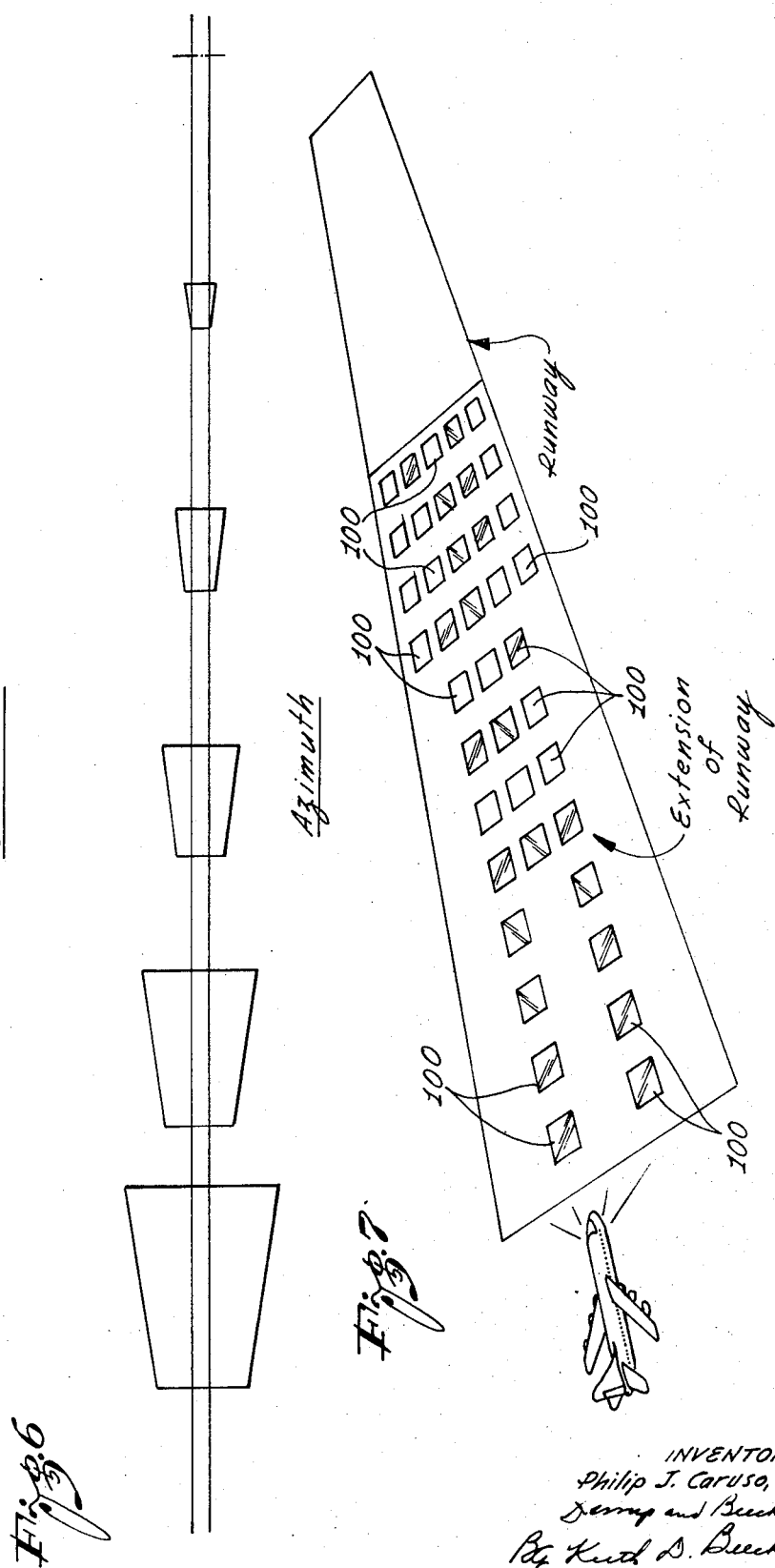

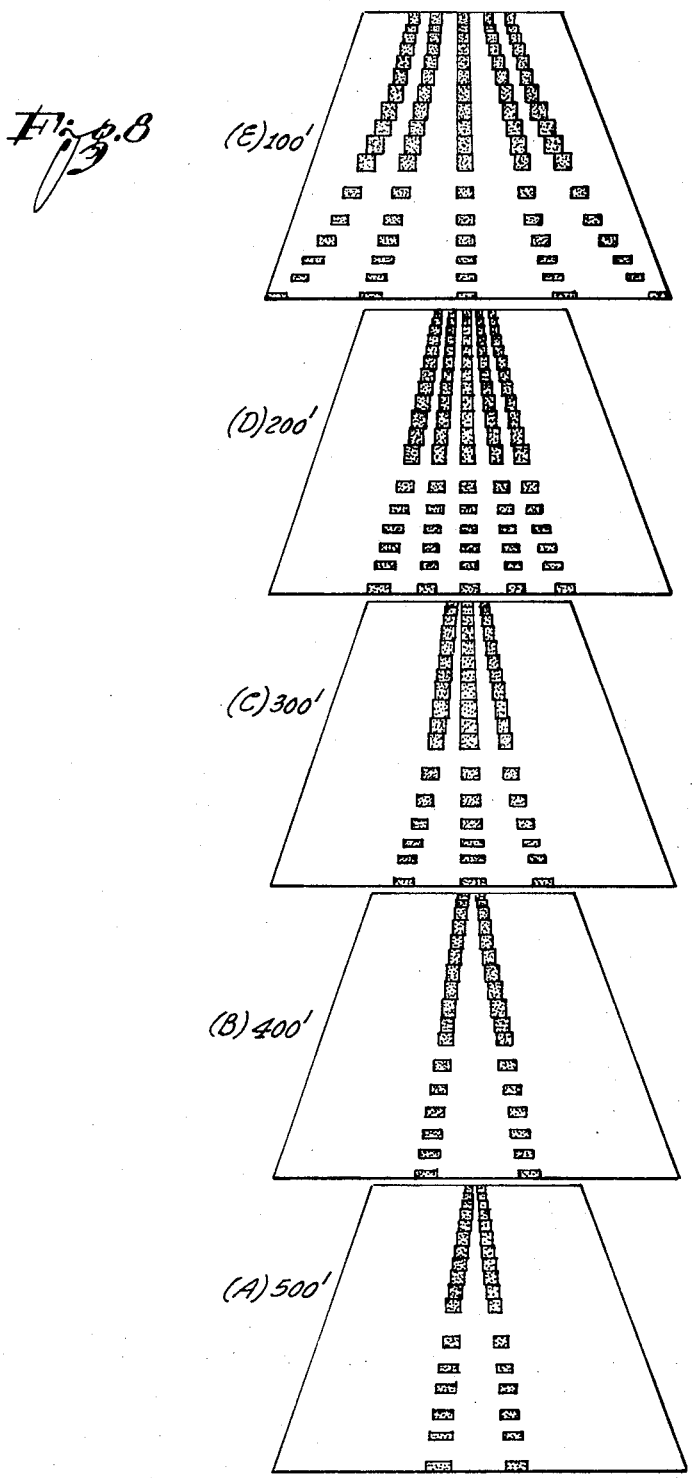

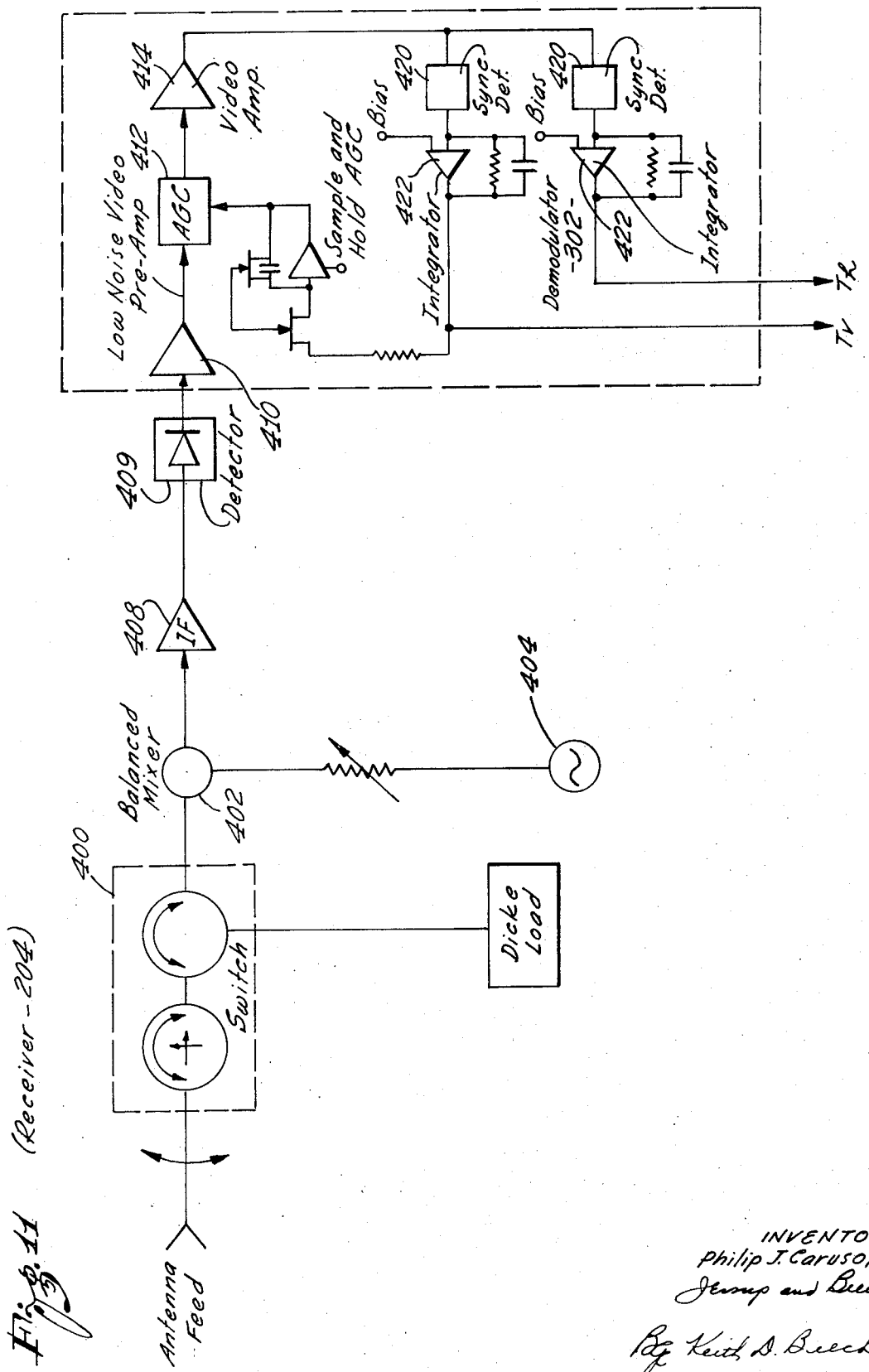

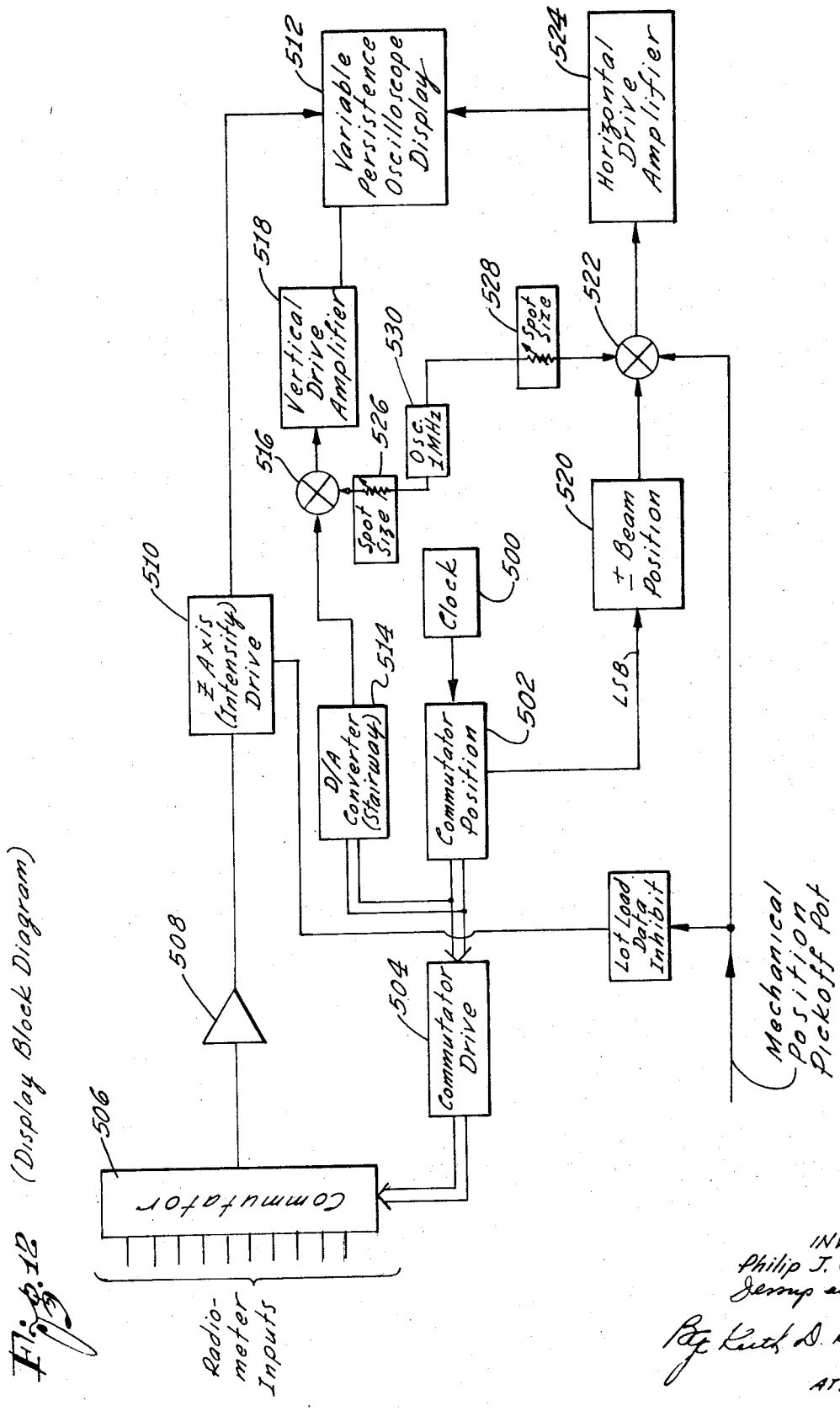
Fig. 12 (Display Block Diagram)

MICROWAVE RADIOMETRIC AIRCRAFT LANDING ASSIST SYSTEM

BACKGROUND OF THE INVENTION

As is well known, the control of air traffic around an airport is a complex problem which is becoming more so in recent years. A major factor involved is the guidance of the aircraft into a successful landing as the runway is approached, and just before the aircraft actually contacts the runway. Since traffic is a continual problem, it is most important that every aircraft be brought in quickly, safely and efficiently, and without delays due to adverse weather conditions.

Improvements in modern electronic guidance control systems permit aircraft to approach runways at more rapid rates, and at more closely spaced intervals, even at night and under adverse weather conditions. However, the occasion often arises that even though the aircraft could be brought into a landing pattern under a particular set of weather conditions, the visibility is such that final touchdown is perilous, so that landings are not attempted. This gives rise to congestion, delays and resulting hazards. The need exists, therefore, for an aid to assist in landing aircraft during times of low visibility, for example, when visibility is less than 100 feet.

The system of the present invention is intended to assist present day electronic instrument landing systems, and to be used in conjunction therewith, to provide the pilot with an effective visible display of a ground pattern, as he actually approaches the runway. As mentioned above, such a display has been achieved in the past by providing light sources in a predetermined pattern along the runway. However, these light sources are often obscured under various weather conditions. In the practice of the present invention, in one of its aspects, the light sources are complemented by passive metallic objects.

One advantage in the use of passive metal objects on the ground is their utter simplicity, and the fact that they require little or no maintenance. The metal objects are detected by a microwave radiometric system in the aircraft, which also is of a passive nature since it is non-radiating. The airborne radiometric system provides a display which analogizes the actual visible light sources, and which is available for the pilot under all weather conditions. The microwave radiometric landing assist system of the present invention is completely reliable, easy to operate, and easy to read, and yet it is exceptionally inexpensive.

The microwave radiometric system to be described comprises, therefore, a ground pattern of metal objects, and an airborne microwave radiometric receiving system. The radiometric receiving system may be of the scanning type, and it may be of the multiple beam variety so as to increase information rate and sensitivity. The landing assist system of the invention provides images of the metallic objects on the ground in a visual display, and directly provides the pilot with guide slope, yaw, and azimuth approach information, all on an instantaneous basis.

Briefly stated, the landing assist system of the invention exhibits a passive requirement on the ground in the form of simple reflectors, with no need for personnel, air or maintenance. Also, the system exhibits a minimum requirement for additional, if any, land area for the reflectors. The airborne system likewise is passive, in that it is non-radiating so as to alleviate any radio frequency interference problems with other equipment in the aircraft. The display information may be readily presented to the pilot in the cockpit in a realistic manner so as to simulate actual visual observation of the runway or runway extension. Moreover, the system of the invention is economical and relatively inexpensive, so that it has general utility.

The landing assist system of the invention is precise in its operation, in that it can establish glide slope, azimuth approach and yaw, all to within 1 degree. Moreover, the system is capable of providing a secondary check on altitude of the aircraft during landing to within approximately ten percent. Although the system is to be described herein as a landing assist for aircraft, it may also be used as a potential aid to prevent collisions, to provide an artificial horizon, or the like.

BRIEF DESCRIPTION OF THE DRAWINGS

FIG. 5 is a schematic representation of a normal glide path of a landing aircraft, and the elevation projection of the scanning pattern of the microwave radiometric receiving system mounted in the aircraft;

FIG. 6 is a schematic representation of the azimuth scan of the airborne microwave radiometric system as the aircraft moves along the glide path of FIG. 5;

FIG. 7 is a view of a runway, having metallic objects placed along its approach section in one possible pattern in accordance with one embodiment of the invention;

FIG. 8 is a schematic representation of successive displays which appear on the display device in the airborne microwave radiometric receiving system, as the aircraft approaches the runway of FIG. 7 for a landing;

FIG. 11 is a more detailed block diagram of the receiver of FIG. 10; and

FIG. 12 is a block diagram of the display device which is included in the radiometric receiving system.

DETAILED DESCRIPTION OF THE ILLUSTRATED EMBODIMENT

Radiometric techniques have been used for many years, particularly at the infrared wavelengths for detection systems. The system of the present invention, however, is predicated upon the use of the microwave wavelengths which extend, for example, from 30 GHz to 300 MHz, at which the techniques differ slightly from those used in the infrared region.

A microwave radiometer is, in effect, a highly sensitive radio receiver. The receiver receives its signals from a directional antenna whose beam is directed at the element or area to be observed. The magnitude of the signal received by the microwave radiometer is proportional to the temperature of the object under observation, and/or the temperature reflected by the object, depending upon the percentage and types of objects within the beam.

Figure 1:
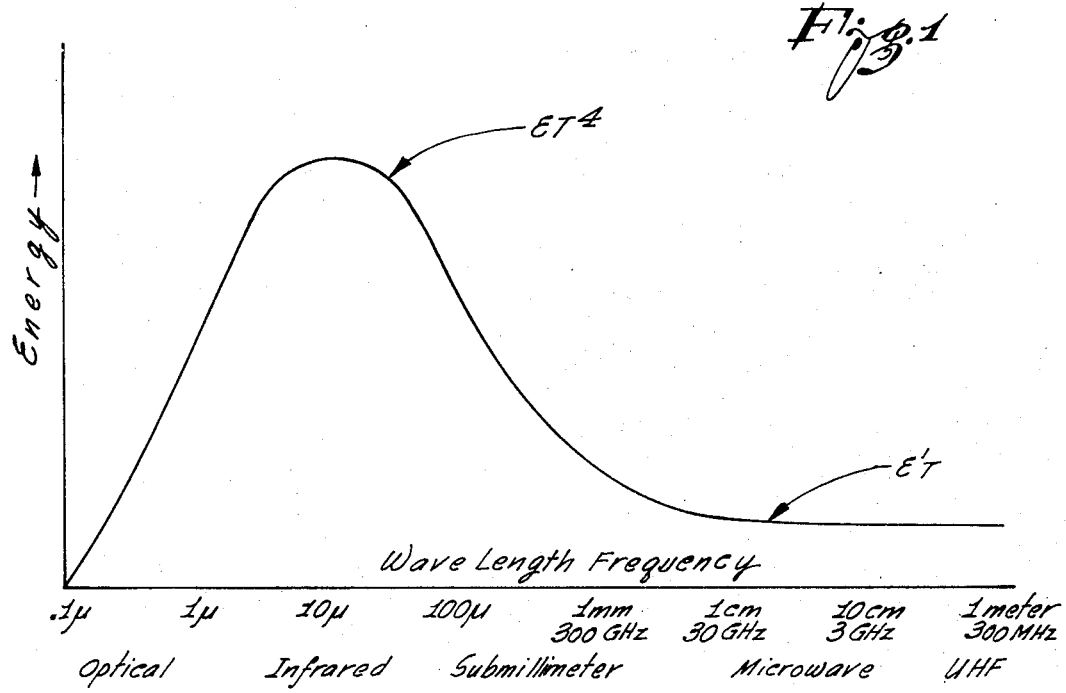
FIG. 1 is a black body radiation curve.

From "black body" theory, any perfectly absorbing body emits radiations at all frequencies according to Planck's radiation law. A curve of relative radiated energy versus wavelength as derived from Planck's radiation law is shown in FIG. 1. It can be seen that within the infrared region of the spectrum, the energy emitted is relatively high and is proportional to the fourth power of its ambient temperature T. At microwave frequencies, on the other hand, the energy varies only directly with T. The energy is much less at the microwave wavelengths than at the infrared wavelengths, as shown by the curve of FIG. 1, but the amount of energy is still significant and the difference in energy levels between the infrared and the microwave wavelengths is overcome by increased microwave radiometer sensitivity as compared with the infrared radiometer.

Figure 2:
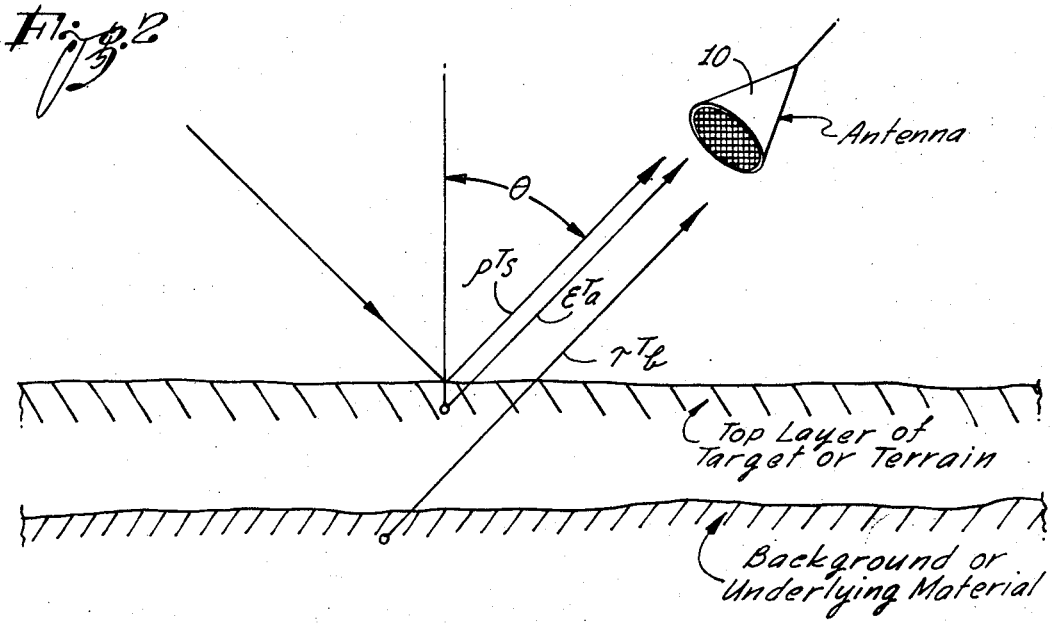
FIG. 2 is a schematic representation of radiometric temperature sources.

A major difference between infrared and microwave radiometric techniques is that the material parameters play a much more significant role at microwave wavelengths than the actual temperature. The apparent temperature being radiated to and collected by the antenna 10 (FIGURE 2) of the microwave radiometer is a combination of apparent temperatures from three sources. The apparent temperature T may be represented by the following equation:

$$T = \epsilon T_a + \rho T_s + \tau T_b \quad (1)$$

where: $\epsilon$, $\rho$, and $\tau$ are the emissivity, reflection and transmissivity coefficients respectively; and $T_a$, $T_s$ and $T_b$ are the ambient temperature of the material, the reflected sky temperature and the background temperature respectively. For most metallic materials $\tau T_b$ is zero and is ignored.

Figure 3:
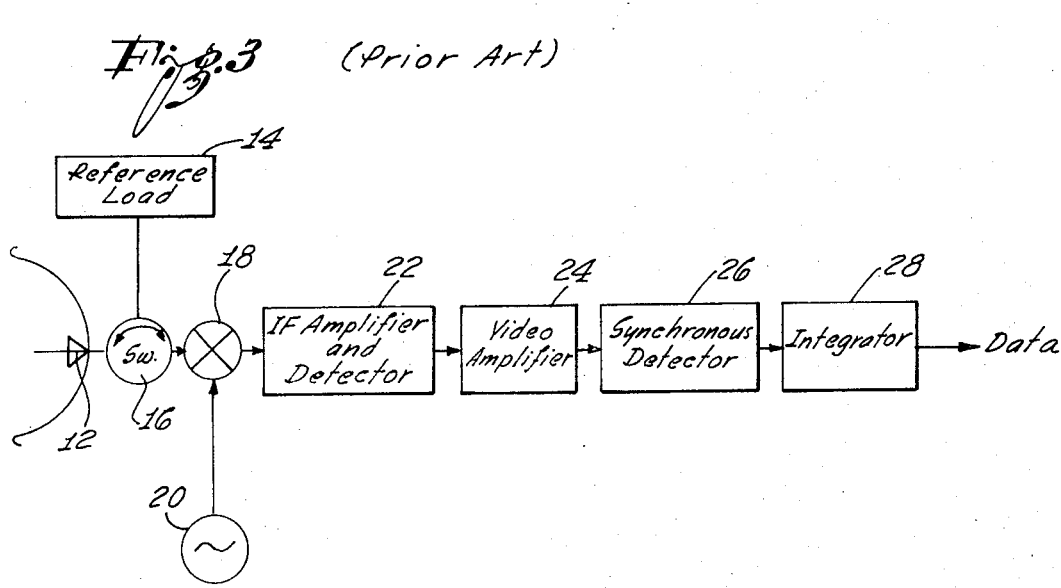
FIG. 3 is a block diagram of a typical prior art microwave radiometer.

Of the several types of prior art microwave radiometers, the most commonly used at present is the Dicke radiometer which is shown in simplified block form in FIG. 3. The Dicke radiometer compares the energy at the antenna 12 with that from a reference load 14, by alternately switching between the antenna and the reference load by means of a switch 16. Both the antenna and reference signals are converted to a selected intermediate frequency in a mixer state 18, by heterodyning them with an appropriate signal from a local oscillator source 20. The resulting intermediate frequency signals are amplified in an intermediate frequency amplifier 22, of one or more stages, and detected.

Other types of radiometric receivers are also appropriate. These include, for example, cooled or uncooled parametric amplifiers, tunnel diode amplifiers, and the like. The Dicke radiometer appears to be the most economical.

The resulting video signals are then amplified in a video amplifier 24, of one or more stages. The video amplifier is followed by an appropriate synchronous detector 26 to assure that only the desired signals are utilized, the synchronous detector being sensitive only at the switching rate of the antenna-reference load switch 16. The resulting output from the synchronous detector 26 is integrated in a usual integrator 28 to provide the output data.

Even though the time sharing between the antenna and the reference load 14 reduces the signal by 50 percent, the Dicke type of radiometer and detection process enhances the detection of weak signals and reduces unwanted noise and gain fluctuations.

The microwave radiometer signal differs from that ordinarily encountered in radar or communications systems in that it is both random in phase and amplitude. That is, the microwave radiometer is required to detect a noise-like signal in a noise background. However, it is important to observe that successive scanning of multiple targets in a systematic pattern, such as proposed for the landing system of the present invention provides 100 percent pattern probability of detection, and prevents any possibility of false pattern occurrences.

Since it may be desirable to obtain pitch or yaw information in the system of the invention with greater accuracy than the beam resolution, beam splitting techniques may be used to increase accuracy, as will be described.

Figure 4:
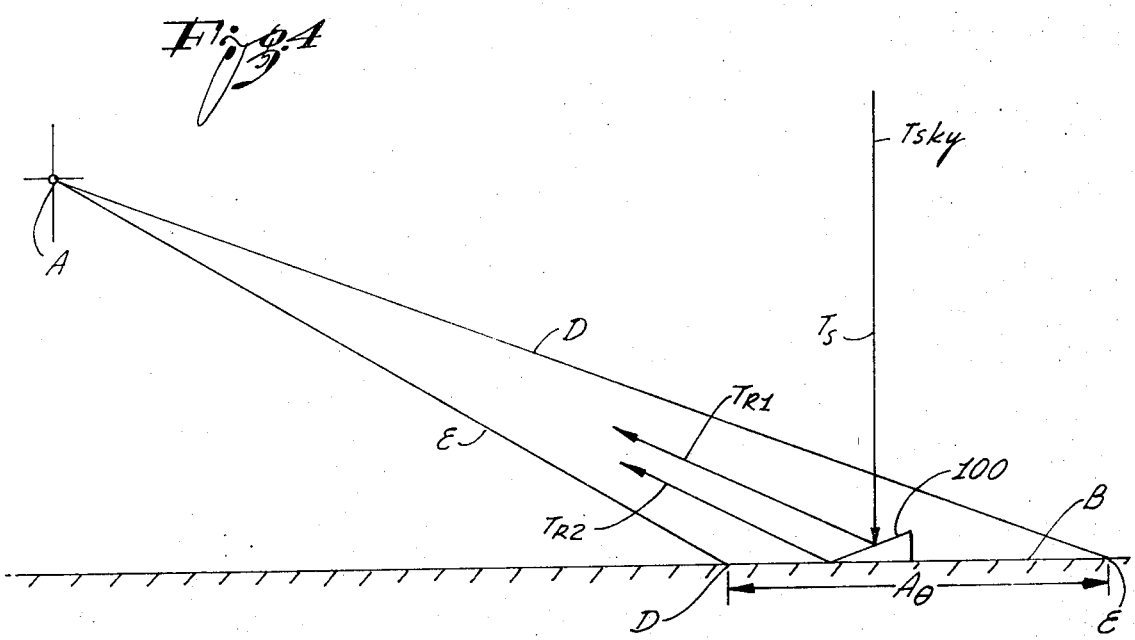
FIG. 4 is a sketch illustrating the boundaries within which energy may be received in the airborne microwave radiometric receiving system of the invention from a metal ground object.

The diagram of FIG. 4 assumes that an aircraft equipped with a microwave radiometric receiver, in the practice of the present invention, is momentarily located at a point "A" over the ground designated "B", and its radiometer antenna is a split beam multiple beam type and is scanning a pattern directed to the ground "B" located within the boundaries "D" and "E". A metallic reflector object 100 located on the ground "B" is tilted towards the point "A", as shown. Energy from the sky, designated $T_s$ is reflected from the tilted metallic reflector 100 within the boundaries "D" and "E", as shown by the vector $T_{r1}$. Also, energy emitted by the ground within the boundaries "D" and "E" is designated by the vector $T_{r2}$. If $A_\theta$ represents the total areas intercepted by the scanning radiometric antenna, and $A_r$ represents the area of the reflector 100, then the parameter $A_r/A_\theta = 1$ percent is adequate for positive detection of the metallic object 100. However, in order to assure complete reflector identification at all times, a ratio of $A_r/A_\theta = 10$ percent appears to be appropriate.

In FIG. 5, a normal glide path of the aircraft of 5°, for example, is denoted. In the particular illustration, it is assumed that a microwave radiometric receiving system is included in the aircraft, and the antenna beam is split into, for example, 20 beams of 2° each, so as to cover a fan in elevation of, for example, 40° between a pitch angle of 25° and 65°. The fan in the particular example shown in FIG. 5 is illustrated at altitudes of 500 feet, 400 feet, 300 feet, 200 feet and 100 feet. However, it will be understood that the actual scan is a continuous sweep of the ground as the aircraft flies along the flight path of FIG. 5 and comes in to a touch down.

As shown in FIG. 6, for example, the fan of the split antenna beams is also swept in azimuth, for example, ± 20° about the center line of the glide path, so as to describe the illustrated patterns as the aircraft flies along its flight path. Again, although the patterns for 500, 400, 300, 200 and 100 feet are shown in FIG. 2B, it will be understood that the radiometric system in the aircraft actually makes a continuous sweep of the ground as the aircraft comes in for a landing.

In the practice of the present invention, in one of its embodiments, and as shown in FIG. 7, a plurality of the metal reflectors 100 referred to in FIG. 1 are laid out along the approach to a runway in adjacent rows. In the illustrated embodiment, for example, different numbers of such rows are shown. The pattern may start with two rows, and increase to three rows, and further increase to five rows, as shown. These metallic reflector objects 100, for example, may be thin metal discs formed of aluminum or other appropriate material. They may vary in size, for example, from approximately two feet to twenty feet in diameter when circular discs are used; or from 2 feet to 20 feet, for example, along each side when square discs are used. In a typical installation, 2½ foot circular discs are used with a twenty foot separation, at the 200 foot altitude position.

As will be described, the microwave radiometer located in the aircraft includes a display device located in front of the pilot to provide him a readily observable display as the aircraft is brought in for a landing. As the aircraft approaches the runway of FIG. 7, the displays observed by the pilot are of the form shown in FIG. 8. For example, the first display "A" seen by the pilot when the aircraft, for example, is at the 500 foot altitude along the flight path of FIG. 5, consists of two rows of the metallic objects 100, as described in conjunction with FIG. 7.

Likewise, in the position "B", the two rows of the reflectors 100 are still being scanned. Then at the position "C" which, for example, may correspond to the 300 foot level in the glide path of FIG. 5, the three rows of reflectors 100 are visible; whereas at the 200 foot level, as shown in the view "D", all five rows of the reflectors 100 are visible on the display. Finally, at the 100 foot to touchdown levels of the aircraft, as shown in the display "D" of FIG. 8, the five rows of the metallic objects 100 remain visible.

It will be appreciated, of course, that the pattern of FIG. 7 of the reflectors 100, and the corresponding displays of FIG. 8 are merely exemplary of one particular pattern which is appropriate, and whereby the pilot is provided with a reliable and simple means of determining the altitude and attitude of his aircraft as he approaches the runway. Any discrepancy in yaw or azimuth is readily apparent from the display of FIG. 8, and the number of reflectors appearing in the display provides a measure of his altitude. The displays of FIG. 8 may appear, for example, on a 5 inch screen of a display device.

Although five separate displays are shown in FIG. 7, as representative of the actual displays when the aircraft, for example, is at 500, 400, 300, 200 and 100 feet, it will be appreciated that the actual display observed by the pilot will be continually changing from instant to instant as the pilot flies along the flight path of FIG. 5. It should be noted, for example, that as the aircraft's altitude changes from 500 feet to 400 feet, the series of lines of reflectors 100 will separate as a function of time, and this separation may be used as a check on altitude.

It should also be noted that with the particular pattern of FIG. 7, when the height is 300 feet, for example, as shown by the display "C", there are three lines of reflectors on the display. This, of course, is completely arbitrary. It may be used as a means to indicate to the pilot his altitude at any given time. The third line of reflectors, of course, does not appear suddenly at 300 feet, but slides into the display starting from the top of the screen at 400 feet (B) and moving down the screen as the aircraft flies between the 400 feet (B) and 300 feet (C) altitude. The additional lines of reflectors which appear on the screen at the 200 feet (D) level also slide into the display in the same manner.

It should be reiterated and emphasized that the particular patterns selected, as shown in FIG. 7, and the particular displays and scanning processes utilized in the illustrated embodiment of the system herein are merely illustrative, and other appropriate patterns and scanning procedures may be selected. As an example, the detected metallic objects might be displayed as points rather than small areas or broadened lines as shown.

Figure 9:
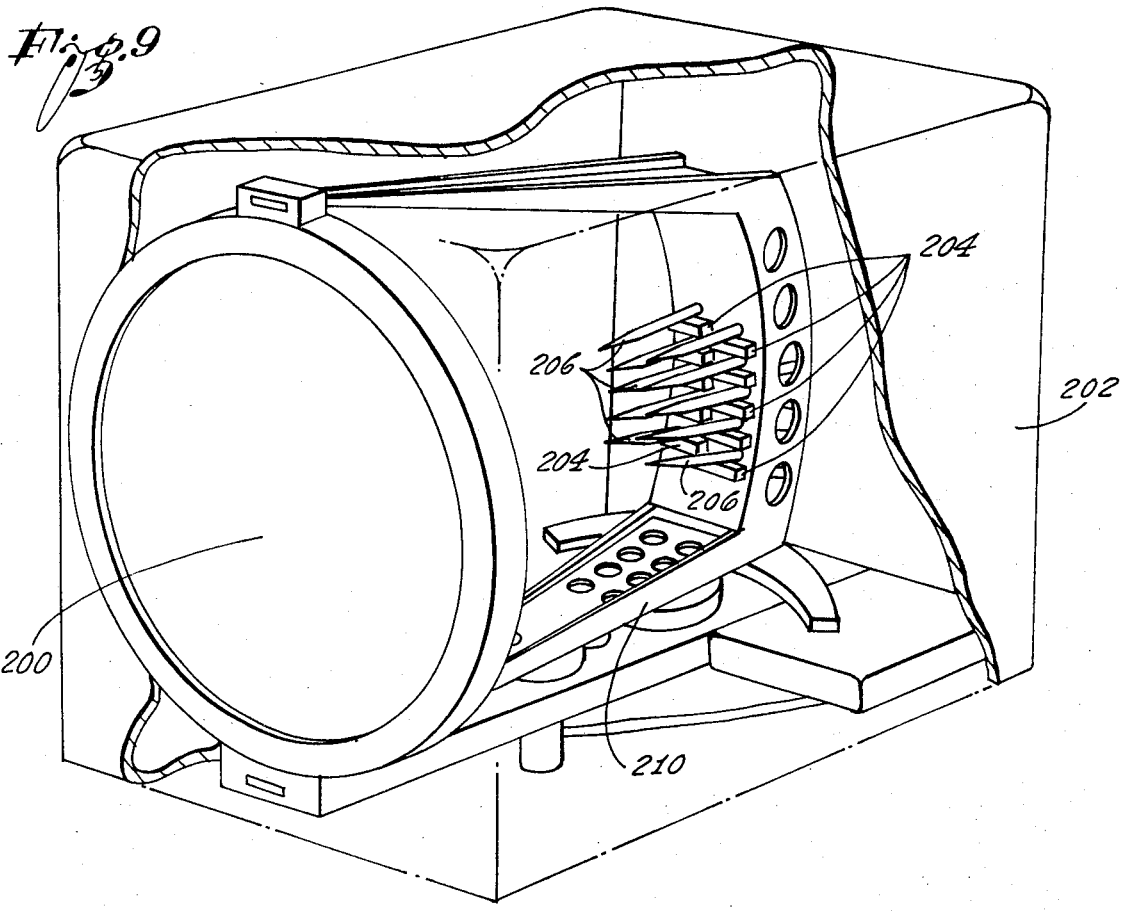
FIG. 9 is an orthographic representation, partly in elevation, of a microwave radiometric receiving system which may be mounted in the aircraft to be incorporated into the landing assist system of the present invention.

An airborne microwave radiometer for use in the practice of the invention is shown in FIG. 9. The system illustrated is a ten beam radiometer, and the antenna 200 is a lens antenna which acts as its own radome. The system is housed in an appropriate housing 202, and ten radiometer receivers 204 are mounted as shown, each with its probe or feed 206 being located at the focal point of the antenna. The receivers are mounted on a yoke 210 which is pivotally moved back and forth by an appropriate drive mechanism (not shown) to achieve the scanning function described above.

The major parameters of the system of the invention, with reference to a particular embodiment, may be as follows. These parameters, of course, are given merely by way of example, and are not intended to limit the invention in any way. For example, the number of beams used in the system, the scan width, the observation angle, and the type of display may be varied to suit the particular requirements of any specific installation.

Type of System — Multi-Beam Scanner
Number of Beams — 10
Field of View — 14° × 40°
Frame Rate — 10 per second
Type of Display — Intensity Modulated Cathode Ray Tube
Operating Frequency Range — Ka Band
System $\Delta T$ (1.0 second integration time) — 0.25°K
Approximate Weight — 45 pounds
Approximate Size — 20 inches × 20 inches × 35 inches
Power Requirements — 115 volts, 2 amperes (60–400 Az)

Figure 10:
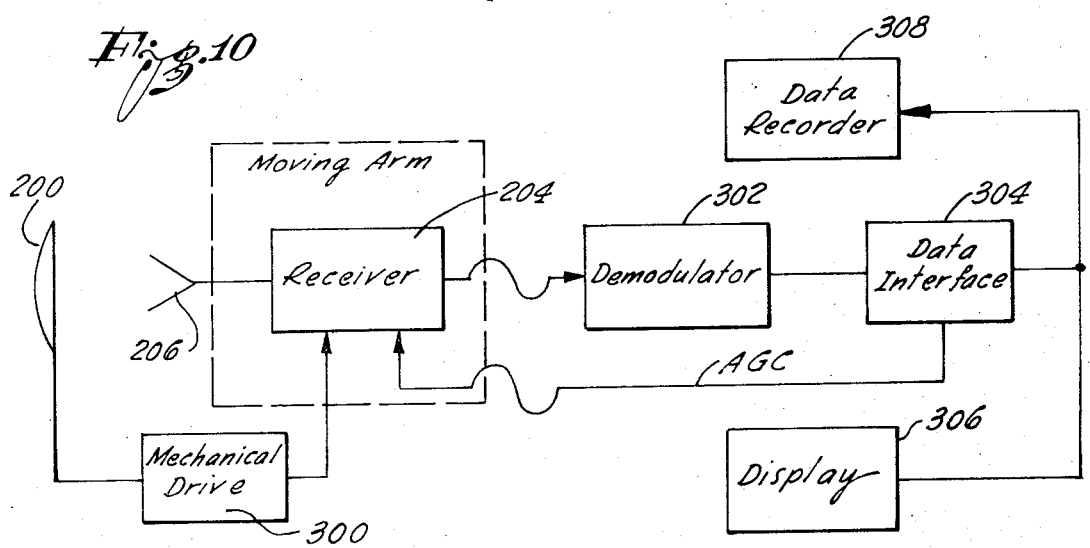
FIG. 10 is a block diagram of any one of the microwave radiometric receivers incorporated into the radiometric receiving system of FIG. 9.

A block diagram of the area imaging microwave sensor which is suitable for use in the landing system of the invention is shown in FIG. 10. As mentioned above, the system in its illustrated embodiment comprises a ten beam microwave scanner, a data interface, and a simple display. The multibeam lens antenna 200 produces ten independent beams displaced over ± 5 beam widths from the lens axis. The wide scanning angle desired for the antenna lens 200 dictates the requirements of a bifocal design in order to maintain adequate performance over the entire scan range. The lens itself may be made of Rexolite material, and it may have a $f/d = 1.0$. An 18 inch aperture, using this type of lens, yields a beam width of 1.4°. Each probe or feed 206 may include a polyrod radiator mounted at the end of a circular wave guide. Ten such probes are mounted with their respective receivers 204 on the yoke 210, as shown in FIG. 9. The assembly is then rotated back and forth as described above, by the mechanical drive designated 300 in FIG. 10, up to ±20° in the transverse plane. The probes 206 form an arc with its center at the focal point of the lens, and all the probes point at the focal point. When scanned in the transverse plane, the path is also an arc with its center at the focal point of the lens.

Each feed assembly 206 for each microwave radiometer receiver consists of a polyrod radiator, mounted in the end of a circular wave guide. The polyrod is approximately two inches long in a constructed embodiment, with the phase center occurring near the middle of the rod. This feed assembly, when integrated with two ferrite rotators, constitutes the entire microwave portion of the radiometer channel. Ten such feeds and ferrite rotators are mounted with their respective receivers on the yoke shown in FIG. 9. The rotators, for example, may be ± 45° Farraday rotation units which require ± 10 milliamps through their coils for switching. The two rotators in each feed are separated by a polarizing load. The assembly then functions as a usual horizontal or vertical polarization selector, controlled by a Dicke switch. The entire rotator assembly in each feed is approximately four inches long. The polarization selector is used to allow the scanning mechanism to operate either in the horizontal direction or the vertical direction, while maintaining sensitivity to vertical polarization in both conditions.

The received microwave signal energy is amplified in each receiver 204, which is a sensitive microwave radiometer receiver. In the present instance, for example, and as shown in FIG. 10, each radiometer receiver 204 is coupled to a demodulator 302, and the demodulated signal is applied through a data interface 304 to the display 306 in the aircraft, and also, if so desired, to a data recorder 308. The data interface 304 also generates an automatic gain control signal for the receiver, also shown in FIG. 10.

The individual radiometer receiver 204 is shown in more detail in FIG. 11. The receiver of FIG. 11 is a broad band superheterodyne receiver with a square law detector, video amplifier, and automatic gain control circuit. The energy from the antenna 206 is passed through a Dicke switch 400 to a broad band wave guide balanced mixer 402. A local oscillator 404 supplies its output to the mixer 402 through a potentiometer 406, and the resulting intermediate frequency signal is amplified in an intermediate frequency amplifier 408. The local oscillator 404 may be a Gunn effect, semiconductor type oscillator, and the intermediate frequency amplifier may be a low noise broad band transistorized circuit.

The output of the intermediate frequency amplifier 408 is applied to the high sensitivity square law detector 409. The detector is followed by a three stage low noise transistorized video pre-amplifier 410 which incorporates an AGC circuit 412. The AGC circuit may consist of a shunt connected field effect transistor attenuator. A video post amplifier 414 is provided consisting of cascaded operational amplifiers to complete the video amplifier section. The portion of the receiving system described above is mounted on the yoke 210, for example, as represented by the blocks 204 in FIG. 9.

The demodulator portion 302 of the radiometer channel contains two identical units. These units each consist of a synchronous detector 420 followed by an integrator 422. By proper switching of the synchronous detectors it is possible to derive a wide variety of combinations of the input signals. The choice of two demodulator sections in the illustrated embodiment is used to obtain two independent data inputs $T_V$ and $T_H$ for the two antenna input ports.

The display 306 suitable for use in the landing system of the invention produces a simple image of the area scanned. The image is oriented with respect to the antenna boresight. Other types of images can be generated with the same basic equipment by the addition of appropriate scanning function generators. The resulting distorted images primarily would be useful in enhancing the visual effects to a pilot, either by causing the image to be oriented with respect to the ground, or by over-emphasizing perspective effects, etc.

The display system is shown in block form in FIG. 12. It includes a clock generator 500 which generates all the timing signals used in the display system. The clock generator has two operational modes, a free-running mode and a synchronized mode. The synchronized mode permits the injection of an external clock signal into the system to synchronize the system with others, such as the data recorder 308 of FIG. 10, or other data recording system. The basic clock signal from the clock generator 500 is counted by a decade counter to obtain the binary coded decimal signals necessary to identify the ten radiometer channels being interrogated in the particular system illustrated herein. The binary coded decimal signals are produced by a computer position binary counter 502 and are introduced through appropriate computator drive stages represented by the block 504 to a computator 506. Then, for successive clock pulses from the clock generator 500, the commutator position counter block 502 causes the commutator drive 504 to switch the commutator 506 from one radiometer channel to the next.

It will be appreciated that the binary coded decimal type of code is used in the particular display of FIG. 12 because of the fact that in the illustrated embodiment, ten simultaneous input lines are handled. Other types of coding would be used for other numbers of radiometers in the system.

By the control of the commutator position block 502, the ten channels of radiometer input are sequentially multiplexed and supplied through an amplifier 508 to the Z axis drive amplifier, as designated by the block 510. The Z axis drive amplifier 510 amplifies the signals from the commutator, corrects for non-linearities in the cathode-ray tube phosphors, and inserts the beam intensity information into the Z-axis coupling of the cathode-ray tube in the variable persistence oscilloscope display represented by the block 512.

Since the commutator position is determined by the output of the digital counter in the block 502, a simple digital-to-analog converter 514 is used to generate the vertical position signal for the cathode-ray tube in the display 512. This signal is applied through a summing network 516 and through a vertical drive amplifier 518 to the cathode-ray tube in the display. The vertical scan signal rapidly scans the beam across the face of the cathode-ray tube, following the commutator across the radiometer input signals. These inputs are arranged so that the data from the radiometers will appear in the proper place on the display.

A usual direct-current position potentiometer (not shown) is included in the antenna scanning mechanism to generate voltages proportional to the antenna position. This potentiometer provides the position of the center of the two sets of antenna beams. Correction to this average position must be made for the staggering of the beam positions. By properly arranging the inputs to the commutator 506, the least significant bit of the commutator position counter 502 carries the information necessary to obtain this correction.

That is, for example, a "1" in this bit indicates the left feed position and a "0" indicates the right feed position. This bit is used to add or subtract a small adjustable voltage by way of the block 520 and through a summing network 522 to the horizontal position signal derived from the aforesaid potentiometer, and which is applied to the cathode-ray tube in the display 512 through a drive amplifier 524.

The normal spot size on the cathode-ray tube in the display 512 is much smaller than the antenna beam width size. The spot size may be controlled independently by potentiometers 526 and 528 interposed between an oscillator 530 and the adders 516 and 522. The oscillator 530 may be a simple 1 Mhz sawtooth oscillator, whose output is added to both the horizontal and vertical sweep signals, in an amount determined by the settings of the potentiometers 526 and 528.

The invention provides, therefore, an improved microwave radiometric low visibility landing aid system for aircraft, and which is particularly advantageous in that the ground elements may be of the passive type requiring a minimum of maintenance, and in that the radiometric system in the aircraft does not involve the radiation of energy which would have a tendency to interfere with other equipment in the aircraft. Also, the system is advantageous in that it is essentially simple and inexpensive. As described, patterns of the ground objects may be used, so as to provide an indication of altitude and attitude when so desired.

What is claimed is:

1. A guidance system for an airborne vehicle including: passive radiation emissive means placed in a particular ground location, said passive radiation emissive means including a multiplicity of separate metallic objects placed in a predetermined pattern on a particular ground location each having a generally horizontal and generally flat radiation face positioned to assume an apparent temperature (T) in accordance with the equation $$T = \epsilon T_a + \rho T_s + \tau T_b,$$

where $\epsilon$, $\rho$ and $\tau$ are the emissivity, reflection and transmissivity coefficients respectively, and $T_a$, $T_s$ and $T_b$ are respectively the ambient temperature of the material, the reflected sky temperature and the background temperature; radio-metric microwave receiving means mounted in said vehicle for detecting radiations over an area including the generally horizontal faces of said metallic objects forming said passive radiation emissive means, said radiations being directly proportional to the aforesaid apparent temperature (T) of the radiation emissive means; and display means coupled to said microwave radiometric receiving means for providing a display of said passive radiation emissive means to the pilot of the vehicle.

2. The system defined in claim 1 in which said particular ground location constitutes a runway extension for landing the airborne vehicle, and in which said metallic objects are placed in adjacent rows.

3. The guidance system defined in claim 1 in which said radiometric receiving means includes a lens type antenna, and at least one radiometric receiver positioned at the focal point of said lens antenna.

4. The guidance system defined in claim 3 and which includes drive means mechanically coupled to said receiver for reciprocally moving said receiver angularly through a predetermined range effectively scanning said receiver over an area and through a predetermined antenna pattern.

5. The guidance system defined in claim 3 and which includes a plurality of radiometric microwave receivers mounted at the focal point of said lens antenna.

* * * * *